(12) United States Patent
Austin

(10) Patent No.: US 7,056,438 B2
(45) Date of Patent: Jun. 6, 2006

(54) FLOOD AND DRAIN WASTEWATER TREATMENT SYSTEM AND ASSOCIATED METHODS

(75) Inventor: David C. Austin, El Prado, NM (US)

(73) Assignee: Dharma Living Systems, Inc., Taos, NM (US)

( * ) Notice: Subject to any disclaimer, the term of this patent is extended or adjusted under 35 U.S.C. 154(b) by 0 days.

(21) Appl. No.: 10/933,139

(22) Filed: Sep. 2, 2004

(65) Prior Publication Data

US 2005/0051482 A1 Mar. 10, 2005

Related U.S. Application Data

(60) Provisional application No. 60/500,654, filed on Sep. 5, 2003.

(51) Int. Cl.
*C02F 3/30* (2006.01)
(52) U.S. Cl. .................. 210/605; 210/618; 210/621; 210/903; 210/630
(58) Field of Classification Search ................ 210/605, 210/617, 618, 621, 630, 903
See application file for complete search history.

(56) References Cited

U.S. PATENT DOCUMENTS

| 3,563,888 | A | | 2/1971 | Klock |
| 4,008,159 | A | | 2/1977 | Besik |
| 4,009,099 | A | * | 2/1977 | Jeris ........................ 210/618 |
| 4,169,050 | A | | 9/1979 | Serfling et al. |
| 4,183,809 | A | | 1/1980 | Klapwijk et al. |
| 4,277,342 | A | | 7/1981 | Hayes et al. |
| 4,284,508 | A | | 8/1981 | Jewell |
| 4,384,956 | A | | 5/1983 | Mulder |
| 4,443,337 | A | | 4/1984 | Otani et al. |
| 4,482,458 | A | | 11/1984 | Rovel et al. |
| 4,620,931 | A | | 11/1986 | Hirata et al. |
| 4,735,723 | A | | 4/1988 | Mulder |
| 4,746,435 | A | | 5/1988 | Onishi et al. |
| 4,800,021 | A | * | 1/1989 | Desbos ........................ 210/605 |

(Continued)

FOREIGN PATENT DOCUMENTS

GB        1 579 623        11/1980

(Continued)

OTHER PUBLICATIONS

Austin, David, "Final Report on The South Burlington, Vermont Advanced Ecologically Engineered System (AEES) for Wastewater Treatment," U.S. Environmental Protection Agency, pps. i-M2, Mar. 4, 2000.

(Continued)

*Primary Examiner*—Christopher Upton
(74) *Attorney, Agent, or Firm*—Allen, Dyer, Doppelt, Milbrath & Gilchrist, P.A.

(57) ABSTRACT

The wastewater treatment system includes at least one fluidized bed reactor, such as a vessel containing media to which biofilms may attach. The vessel has an inlet and an outlet adjacent a bottom, and an overflow outlet adjacent a top, of the vessel. An element for admitting wastewater into the vessel and for agitating wastewater therein with sufficient energy to scour biofilm from the media, and for admitting additional wastewater into the vessel following a predetermined time to a level sufficient to cause water and at least some of the scoured biofilm to exit via the overflow outlet. Wastewater is drainable through the bottom outlet after a predetermined time for permitting aeration of the media. These fill and drain cycles effect a "tidal" nitrification and denitrification of the wastewater, with, for example, ammonia being converted ultimately to nitrogen gas.

19 Claims, 1 Drawing Sheet

U.S. PATENT DOCUMENTS

| | | | |
|---|---|---|---|
| 4,895,645 A | | 1/1990 | Zorich, Jr. |
| 4,921,604 A | | 5/1990 | Moellenbeck |
| 5,078,884 A | | 1/1992 | Mulder |
| 5,126,050 A | | 6/1992 | Irvine et al. |
| 5,192,442 A | * | 3/1993 | Piccirillo et al. ............ 210/903 |
| 5,259,959 A | | 11/1993 | Mulder |
| 5,447,633 A | * | 9/1995 | Matsche et al. ............. 210/605 |
| 5,487,829 A | | 1/1996 | Safferman et al. |
| 5,518,618 A | | 5/1996 | Mulder et al. |
| 5,565,098 A | | 10/1996 | Vellinga |
| 5,618,431 A | * | 4/1997 | Kondo et al. ................ 210/618 |
| 5,750,041 A | * | 5/1998 | Hirane ........................ 210/617 |
| 5,788,842 A | | 8/1998 | Frisch |
| 5,863,433 A | * | 1/1999 | Behrends .................... 210/617 |
| 5,863,435 A | | 1/1999 | Heijnen et al. |
| 5,906,745 A | | 5/1999 | Eto |
| 5,948,262 A | | 9/1999 | Todd et al. |
| 5,985,149 A | | 11/1999 | Raetz et al. |
| 6,063,273 A | | 5/2000 | Habets et al. |
| 6,090,294 A | | 7/2000 | Teran et al. |
| 6,171,480 B1 | | 1/2001 | Lee et al. |
| 6,183,642 B1 | | 2/2001 | Heijnen et al. |
| 6,383,390 B1 | | 5/2002 | Van Loosdrecht et al. |
| 6,447,681 B1 | | 9/2002 | Carlberg et al. |
| 6,585,886 B1 | | 7/2003 | Luehr |
| 6,645,374 B1 | | 11/2003 | Cote et al. |
| 6,692,642 B1 | | 2/2004 | Josse et al. |
| 2002/0148779 A1 | | 10/2002 | Shieh et al. |
| 2002/0185437 A1 | | 12/2002 | Haridas et al. |
| 2003/0111412 A1 | * | 6/2003 | Jeong et al. ................ 210/618 |
| 2004/0000517 A1 | | 1/2004 | Austin et al. |

FOREIGN PATENT DOCUMENTS

| | | |
|---|---|---|
| WO | WO 95/17351 | 6/1995 |
| WO | WO 02/076893 | 10/2002 |

OTHER PUBLICATIONS

Sun et al., "Treatment of Agricultural Wastewater in a Combined Tidal Flow-Downflow Reed Bed System," Water Science Technology, vol. 40, No. 3, pps. 139-146, 1999.

Von Felde, Katrin and Kunst, Sabine, "N- and Cod-Removal in Vertical-Flow Systems," Water Science Technology, vol. 35, No. 5, pp. 79-85, Permagon Press, Oxford, 1997.

Alleman, James E., "The History of Fixed-Film Wastewater Treatment Systems," pp. 18, retrieved on Jul. 14, 2004. Retrieved from the Internet: <URL:http://bridge.ecn.purdue.edu/~alleman/w3-class/456/article/article-biofilmhistory.html>.

Lazarova, Valentina and Manem, Jacques, "Innovative Biofilm Treatment Technologies for Water and Wastewater Treatment," *Biofilms II: Process Analysis and Applications*, pp. 159-206, 2000.

\* cited by examiner

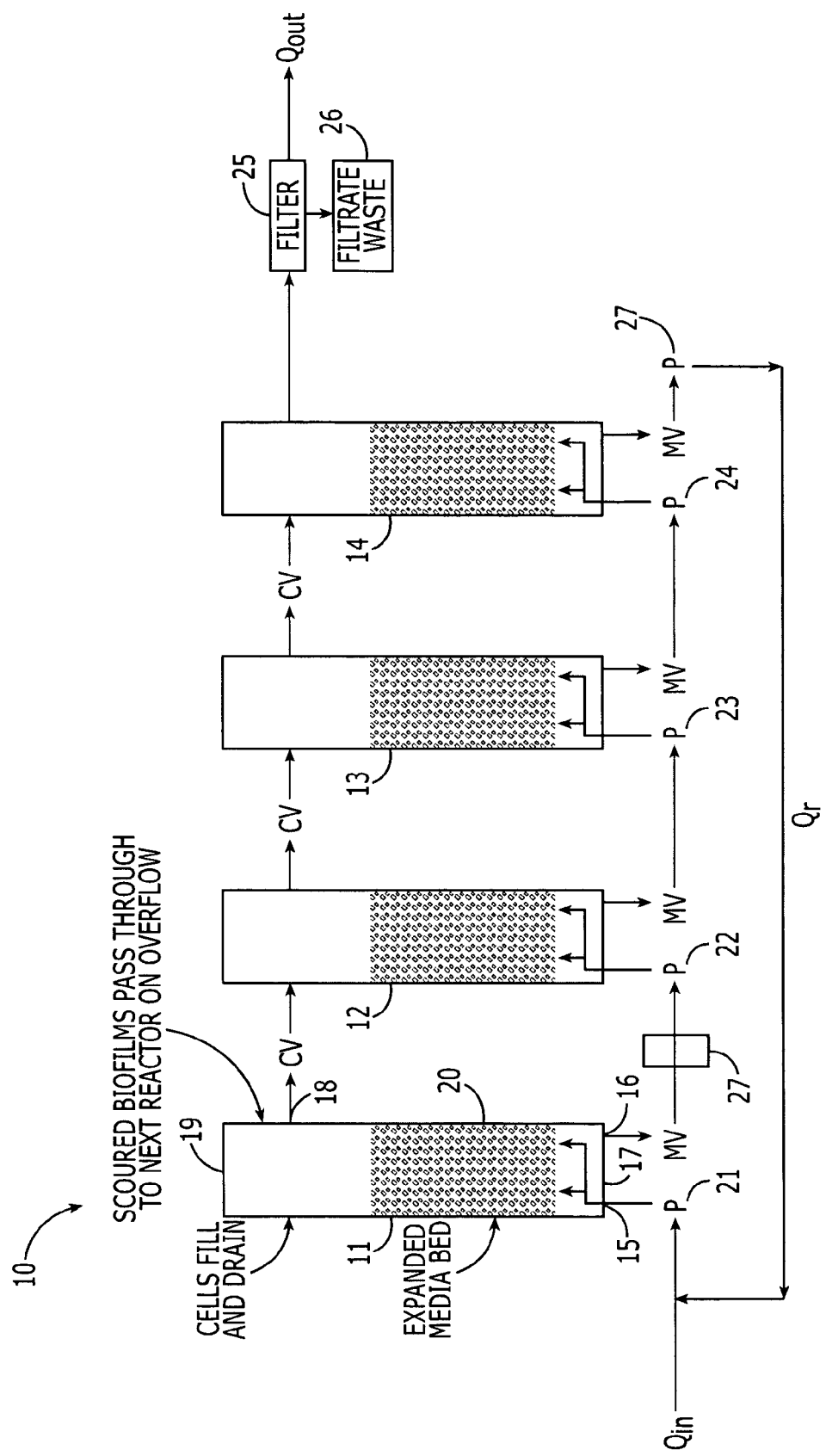

FLOOD AND DRAIN WASTEWATER TREATMENT SYSTEM AND ASSOCIATED METHODS

CROSS-REFERENCE TO RELATED APPLICATION

This application claims priority from provisional application 60/500,654, filed Sep. 5, 2003, entitled "Flood and Drain Wastewater Treatment System and Associated Methods."

BACKGROUND OF THE INVENTION

1. Field of the Invention

The present invention relates to wastewater treatment systems and more particularly, to such systems and methods using fluidized bed reactors.

2. Description of Related Art

Biological fluidized bed reactors have been widely used to remove dissolved and suspended organic matter from wastewater. A fluidized reactor uses bacterial biofilms attached to media to biologically convert wastewater constituents to desirable end products. Examples are the conversion of organic carbon to carbon dioxide and the conversion of organic nitrogen into ammonia or nitrate to atmospheric nitrogen. Within a fluidized reactor circulation of water or sparging by air causes media particles to move and circulate. Media particles then abrade each other, resulting in the scouring of excess biofilm from the surface of media particles. The excess biofilm may continue to circulate within or pass out of the reactor, depending on the design of the reactor. These biofilm reactors may be aerobic, anoxic, or anaerobic as called for in a particular application.

The fluidized bed reactors use an attached biofilm fluidized bed process that is based on the concept that large biomass concentrations can be achieved on a large surface area by dense biofilm attachment to an inert small particle size carrier. A large surface area is created by small inert particles in a bed, fluidized by upward flow or air sparging. The intense mixing occurring in the bed minimizes diffusion limitations and eliminates clogging and short-circuiting problems. These reactors accumulate large amounts of active biomass, and can achieve very long cell detention times. In some designs, the bed is fluidized by the upward flow through the column of untreated wastewater mixed with recirculated effluent. The upward flow necessary to achieve bed fluidization is distributed by means of various nozzles or small-diameter pipes placed at the bottom of the column. Biofilm develops on the inert media, and the physical attachment of anaerobic bacteria to the media surface prevents biomass washout. The high fluid shear force resistance of biofilms allows these reactors to be operated at upflow velocities that would otherwise wash out unattached biomass.

Under some conditions the turbulent flow exerts sufficient shear to prevent the development of thick biofilms on the media, which limit mass transfer. The high surface-to-volume ratio of the bulk of the bed inert media (300 to 2500 $ft^2/ft^3$) creates a vast area for the development of microbial biofilm. Approximately 95 percent of the active biomass in a well-operated fluidized bed reactor is attached growth. This fact enables the development of dense but thin biofilms that lead to high concentrations of attached biomass in the bed.

Despite the great advantages that this process offers in terms of high organic loading rates, short hydraulic retention times, and low excess solids generation, the use of these reactors has not been extensive owing to various design limitations.

Previously submitted patent applications, U.S. Pat. No. 2003/0230529 and U.S. Pat. No. 2004/0000517, commonly owned with the present invention, have introduced the concept of nitrification and denitrification mediated by tidal flow. The disclosures of these applications are hereby incorporated hereinto by reference.

SUMMARY OF THE INVENTION

The present invention addresses shortcomings in known fluidized bed systems. The wastewater treatment system comprises at least one fluidized bed reactor. The reactor comprises a vessel containing media that have a surface adapted to permit biofilms to attach thereto. The vessel has an inlet and an outlet adjacent a bottom of the vessel and an overflow outlet adjacent a top of the vessel.

The system also includes means for admitting wastewater into the vessel via the inlet and means for agitating wastewater in the vessel with sufficient energy to scour biofilm material from the media. Means are also provided for admitting additional wastewater into the vessel via the inlet following a predetermined time to a level sufficient to cause water and at least some of the scoured biofilm material to exit the overflow outlet. Finally, means are provided for draining wastewater through the bottom outlet after a predetermined time for permitting aeration of the media. These fill and drain cycles effect a "tidal" nitrification and denitrification of the wastewater, with, for example, ammonia being converted ultimately to nitrogen gas.

The method for treating wastewater of the present invention comprises the steps of contacting media with wastewater to be treated in a vessel for a predetermined time, and agitating the wastewater in the vessel with sufficient energy to scour biofilm material from the media. Additional wastewater is added to the vessel to an overflow level. The overflow contains at least some of the scoured biofilm material.

Next the vessel is drained to permit the media to be aerated, and is refilled after a second predetermined time to begin the cyclic process anew.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

BRIEF DESCRIPTION OF THE DRAWINGS

THE FIGURE is a schematic representation of an exemplary system of the present invention that includes a plurality of reactors in series.

DETAILED DESCRIPTION OF THE PREFERRED EMBODIMENTS

A description of the preferred embodiments of the present invention will now be presented with reference to THE FIGURE.

The system 10 illustrated in THE FIGURE comprises a series, here four 11–14, of fluidized bed reactors, although this is not intended as a limitation, and a single-reactor embodiment may also be contemplated. Each reactor vessel 11–14 has an inlet 15 and an outlet 16 adjacent the bottom 17, and an overflow outlet 18 adjacent the top 19. Each reactor 11–14 is filled with media 20, which may be either buoyant or nonbuoyant. The media 20 preferably has substantial natural or induced cation adsorption capacity.

Pumps 21–24 in fluid communication with the inlets 15 are provided for filling the reactors 11–14 with wastewater to be treated, represented by "$Q_{in}$" in THE FIGURE. Drainage "MV" through the bottom outlets 16 may be accomplished via gravity flow, as illustrated, by using another pump (not shown), or a combination thereof. The drained water may be filtered 27 at this stage if desired or necessary, depending upon the composition of the wastewater. Overflowing water "CV" exits via the overflow outlets 18 by means, for example, of a drainpipe, to a downstream reactor in the case of reactors 11–13 or to a final filter 25, from which emerges cleansed water "$Q_{out}$" and filtrate waste 26.

Recycle of water exiting the final reactor 14 via its bottom outlet 16 is effected by pump 27, which channels drained water "$Q_r$" back to the first reactor's pump 21.

In a first embodiment of the system 10, the media 20 comprises a nonbuoyant media. In this case the pumps 21–24 are sized to create sufficient upflow velocity to fully fluidize the media 20 when the vessel 11 is substantially full.

In a second embodiment of the system 10, the media 20 comprises a buoyant media, and the pumps 21–24 may act to fill the vessel 11 from the bottom 17 as shown or alternatively from the top 19. In this embodiment fluidization is accomplished by means of an air (or other gas) sparging pump used when the vessel 11 is substantially full, or by another mechanical means.

In use the elements of the present system 10 operate in the method of the present invention as follows. One or more flood and drain reactors 11–14 are filled with media 20, buoyant or nonbuoyant, the surface of which serves as a physical attachment site for biofilms. A pump for each reactor 11–14 is used to fill the reactors 11–14, typically from the bottom 17, although for the case of buoyant media, the reactors 11–14 may be filled from the top 19. The first reactor 11 in the series receives influent $Q_{in}$. Anaerobic/anoxic reactions occur during this period, as the solubility of oxygen in water is relatively low.

For the case of nonbuoyant media, fluidization is effected by pumping at sufficient upward velocity to fully fluidize the media 20 when the reactor 11–14 is substantially full. For buoyant media, fluidization is effected by air or gas sparging when the reactor 11–14 is substantially full, or by using other mechanical means. In either case, fluidization serves to scour excess biofilm from the media surfaces, which serves to prevent biofouling/biobinding of media, which can cause reactor failure.

Next additional wastewater is added to the reactor 11–14 sufficient to cause overflow CV from the top 19 of the vessel 11–14, the overflow carrying along with it the scoured biofilm material. In the case of all but the last reactor in the series 11–13, this overflow is channeled to the next reactor downstream 12–14; for the last reactor 14, the overflow is channeled to a filter 25, which separates filtrate waste 26 from exiting water $Q_{out}$. Periodically the reactors 11–14 are drained from the bottom 17, and the media 20 is allowed to aerate, permitting aerobic reactions to occur on the biofilms. The drainage MV, which may be filtered 27 if desirable or necessary, in the case of the all but the last reactor 11–13, is channeled to the bottom 17 of the next reactor 12–14 downstream; that of the final reactor 14 is recycled $Q_r$ to the bottom 17 of the first reactor 11 to re-enter the system 10.

Typically the reactors 11–14 will be on alternating flood and drain cycles with their neighboring reactors. At least one of the reactors should experience a flood and drain cycle within a 24-hour period.

The chemical reactions occurring within the reactors is believed to operate as follows:

1. When a reactor is flooded, ammonia ions in the wastewater adsorb to biofilms and media.

2. When the reactor is drained, ammonia ions rapidly nitrify in the biofilms upon exposure to atmospheric oxygen.

3. Upon reflooding, nitrate/nitrite ions in the biofilms desorb into the bulk water.

4. Nitrate/nitrite ions are used as terminal electron acceptors in bacterial respiration reactions, causing denitrification, and the liberation of nitrogen gas.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the system illustrated and described herein are by way of example, and the scope of the invention is not limited to the exact details of construction and use.

What is claimed is:

1. A method for treating wastewater comprising the steps of:
   contacting media with wastewater to be treated in a vessel for a predetermined time, the media having a surface adapted to permit biofilms to attach thereto;
   agitating the wastewater in the vessel with sufficient energy to scour at least some of the biofilm material from the media surface;
   adding additional wastewater to the vessel to an overflow level, the overflow containing at least some of the scoured biofilm material;
   draining the vessel for aerating the media surface; and
   refilling the vessel after a second predetermined time.

2. The method recited in claim 1, wherein the media has one of natural or induced cation adsorption capacity.

3. The method recited in claim 1, wherein the draining step comprises at least one of permitting gravity flow through a vessel bottom outlet and pumping out the vessel through the vessel bottom outlet.

4. The method recited in claim 1, further comprising the step of filtering the water drained from the vessel.

5. The method recited in claim 1, further comprising the step of filtering the overflow.

6. The method recited in claim 1, further comprising the step of recycling at least some of the drained water to the vessel for additional treatment.

7. The method recited in claim 1, wherein the media comprise a substantially nonbuoyant media, and wherein the agitating step comprises pumping wastewater into the vessel with sufficient upflow velocity to fluidize the media when the vessel is substantially full.

8. The method recited in claim 1, wherein the media comprise a substantially buoyant media, and wherein the agitating step comprises fluidizing the media with one of a gas sparging pump and a mechanical agitation means.

9. The method recited in claim 1, wherein the media-contacting step comprises pumping the wastewater into the vessel from an inlet adjacent a vessel bottom.

10. The method recited in claim 9, wherein the wastewater-adding and the vessel-refilling steps each comprise introducing the wastewater through the inlet.

11. A method for treating wastewater comprising the steps of:
- contacting media with wastewater to be treated in a first vessel for a predetermined time, the media having a surface adapted to permit biofilms to attach thereto;
- agitating the wastewater in the first vessel with sufficient energy to scour at least some of the biofilm material from the media surface;
- adding additional wastewater to the first vessel to an overflow level, the overflow containing at least some of the scoured biofilm material;
- transporting the overflow to a second vessel containing media having a surface adapted to permit biofilms to attach thereto, the second vessel having an inlet and an outlet adjacent a bottom thereof and an overflow outlet adjacent a top thereof;
- draining the first vessel for aerating the media surface;
- transporting the drainage from the first vessel to the second vessel;
- refilling the first vessel after a second predetermined time;
- agitating the wastewater in the second vessel with sufficient energy to scour at least some of the biofilm material from the media surface;
- adding additional wastewater to the second vessel to an overflow level, the overflow containing at least some of the scoured biofilm material; and
- draining the second vessel for aerating the media surface.

12. The method recited in claim 11, wherein the media has one of natural or induced cation adsorption capacity.

13. The method recited in claim 11, wherein the draining steps comprise at least one of permitting gravity flow through a first and a second vessel bottom outlet and pumping out the vessel through the first and the second vessel bottom outlets.

14. The method recited in claim 11, further comprising the step of filtering the water drained from at least one of the first and the second vessel.

15. The method recited in claim 11, further comprising the step of filtering the overflow from at least one of the first and the second vessel.

16. The method recited in claim 11, further comprising the step of recycling at least some of the drained water from the second vessel to the first vessel for additional treatment.

17. The method recited in claim 11, wherein the media comprise a substantially nonbuoyant media, and wherein the agitating steps comprise pumping wastewater into the respective first and the second vessel with sufficient upflow velocity to fluidize the media when the, respective first and second vessel is substantially full.

18. The method recited in claim 11, wherein the media comprise a substantially buoyant media, and wherein the agitating steps comprise fluidizing the media in the respective first and the second vessel with one of a gas sparging pump and a mechanical agitation means.

19. A method for treating wastewater comprising the steps of:
- contacting media with wastewater to be treated in a vessel for a first predetermined time, the media having a surface adapted to permit biofilms to attach thereto, the biofilms comprising bacteria;
- permitting ammonia ions in the wastewater to adsorb to biofilms and the media;
- agitating the wastewater in the vessel with sufficient energy to scour at least some of the biofilm material from the media surface;
- draining the vessel for aerating the media surface, causing a nitrification of the adsorbed ammonia ions to nitrate and nitrite ions upon exposure to oxygen in the air;
- refilling the vessel with water after a second predetermined time, thereby permitting the nitrate and nitrite ions to desorb into the refilling water; and
- permitting respiration of the biofilm bacteria to occur, wherein the nitrate and nitrite ions become terminal electron acceptors in respiration reactions, leading to a liberation of nitrogen gas.

* * * * *